(12) United States Patent
Holman et al.

(10) Patent No.: US 11,993,192 B2
(45) Date of Patent: May 28, 2024

(54) TRANSLOCATABLE SLURRY-CONTAINING HOPPER

(71) Applicants: Lawrence Holman, Warren, MI (US); David Masar, Warren, MI (US)

(72) Inventors: Lawrence Holman, Warren, MI (US); David Masar, Warren, MI (US)

(*) Notice: Subject to any disclaimer, the term of this patent is extended or adjusted under 35 U.S.C. 154(b) by 702 days.

(21) Appl. No.: 17/008,358

(22) Filed: Aug. 31, 2020

(65) Prior Publication Data

US 2022/0063475 A1 Mar. 3, 2022

(51) Int. Cl.
| | |
|---|---|
| *B60P 1/34* | (2006.01) |
| *B60P 1/02* | (2006.01) |
| *B60P 1/16* | (2006.01) |
| *B60P 1/64* | (2006.01) |

(52) U.S. Cl.
CPC ............... *B60P 1/34* (2013.01); *B60P 1/02* (2013.01); *B60P 1/162* (2013.01); *B60P 1/6418* (2013.01)

(58) Field of Classification Search
CPC ...... B60P 1/34; B60P 1/02; B60P 1/62; B60P 1/6418; B60P 1/56; B60P 1/26; B60P 1/162; B60P 1/28; B60P 1/283; B60P 1/286; B60P 1/58; E01C 19/20; B66F 9/19
USPC .......... 298/11, 17.5, 23 MD, 10, 17.8, 19 B, 298/22 R
See application file for complete search history.

(56) References Cited

U.S. PATENT DOCUMENTS

| | | | | |
|---|---|---|---|---|
| 2,299,702 A | * | 10/1942 | Mosel ................... | B65D 88/30 D15/27 |
| 3,361,476 A | * | 1/1968 | Smock .................. | B60P 1/003 298/7 |
| 3,528,577 A | * | 9/1970 | Rose ...................... | B65B 69/00 414/420 |
| 4,162,766 A | * | 7/1979 | Ten Broeck ......... | E01C 19/203 291/1 |
| 4,321,876 A | * | 3/1982 | Mikus ................... | F23J 1/02 110/165 R |
| 4,568,239 A | * | 2/1986 | Sims ..................... | B65D 88/56 298/17.5 |
| 5,033,932 A | * | 7/1991 | Compton .............. | B60P 1/38 209/261 |

(Continued)

FOREIGN PATENT DOCUMENTS

| | | |
|---|---|---|
| CN | 210705354 | 6/2020 |
| EP | 2396194 | 12/2011 |
| WO | 2017014768 | 1/2017 |

*Primary Examiner* — Stephen T Gordon
(74) *Attorney, Agent, or Firm* — Brooks Kushman P.C.

(57) ABSTRACT

Several aspects of this disclosure relate to a translocatable hopper that is mounted for example at the forward part of a front-end loader vehicle. The hopper receives, re-positions and delivers a slurry to a jobsite and preferably is detachably attached to a vehicle. In several embodiments, the hopper is translocatable from a resting position to a delivery position through one or more intermediate positions. Preferably, a front wall has an outlet gate and a chute extending therefrom. The chute is configured to direct slurry into the jobsite, A rising and falling sluice gate is associated with the chute. The slurry moves outwardly from the chute when the sluice gate is at least partially opened as the hopper is placed at or near or above the delivery position above the jobsite.

14 Claims, 4 Drawing Sheets

(56) References Cited

U.S. PATENT DOCUMENTS

| | | | |
|---|---|---|---|
| 5,127,740 A * | 7/1992 | DeBoer | B28C 7/0053 366/15 |
| 7,147,360 B2 * | 12/2006 | Elefsrud | B62B 3/104 366/14 |
| 8,142,134 B2 | 3/2012 | Lavoie et al. | |
| 9,931,971 B1 * | 4/2018 | Null | A01C 15/18 |
| 10,300,828 B2 | 5/2019 | Herman et al. | |
| 2001/0008076 A1 * | 7/2001 | Alexander | C03B 3/023 65/335 |
| 2003/0080603 A1 * | 5/2003 | Connor | A01C 15/122 298/24 |
| 2007/0160452 A1 * | 7/2007 | Kerwin | E04G 21/025 414/722 |
| 2009/0121536 A1 * | 5/2009 | McIntosh | B60P 1/483 298/22 R |

\* cited by examiner under the US 11,993,192 B2

TRANSLOCATABLE SLURRY-CONTAINING HOPPER

TECHNICAL FIELD

Several aspects of this disclosure relate to a hopper that receives a slurry in an industrial or commercial environment such as a building site.

BACKGROUND

Several aspects of this disclosure relate to a hopper that receives a slurry in an industrial or commercial environment such as a building site. The hopper is attached to a front-end loader vehicle that raises or lowers the slurry-containing hopper.

Among the art considered in preparing this application are these references: U.S. Pat. Nos. 7,252,309; 8,142,134; 10,300,828; WO 2017/014768 A1; CN 210705354U and EP 2396194 B1.

SUMMARY

Several aspects of this disclosure relate to a translocatable hopper that is mounted for example at the forward part of a front-end loader vehicle. The hopper receives, re-positions and delivers a slurry to a jobsite and preferably is detachably attached to the vehicle. In several embodiments, the hopper is translocatable from a resting position to a delivery position through one or more intermediate positions.

One embodiment of the hopper includes a floor and walls that extend upwardly from the floor. The walls include a front wall from which the slurry is delivered to the jobsite, a pair of side walls and a back wall that faces the vehicle.

Preferably, the front wall has an outlet gate and a chute extending therefrom. The chute is configured to direct slurry towards the jobsite, A hydraulically operated rising and falling sluice gate is associated with the chute. In several embodiments, the gate is oriented in a plane that is inclined to a vertical plane when the hopper is in the resting position. The slurry moves outwardly from the chute when the sluice gate is at least partially opened as the hopper is placed at or near the delivery position above the jobsite.

DETAILED DESCRIPTION

Figure 1:
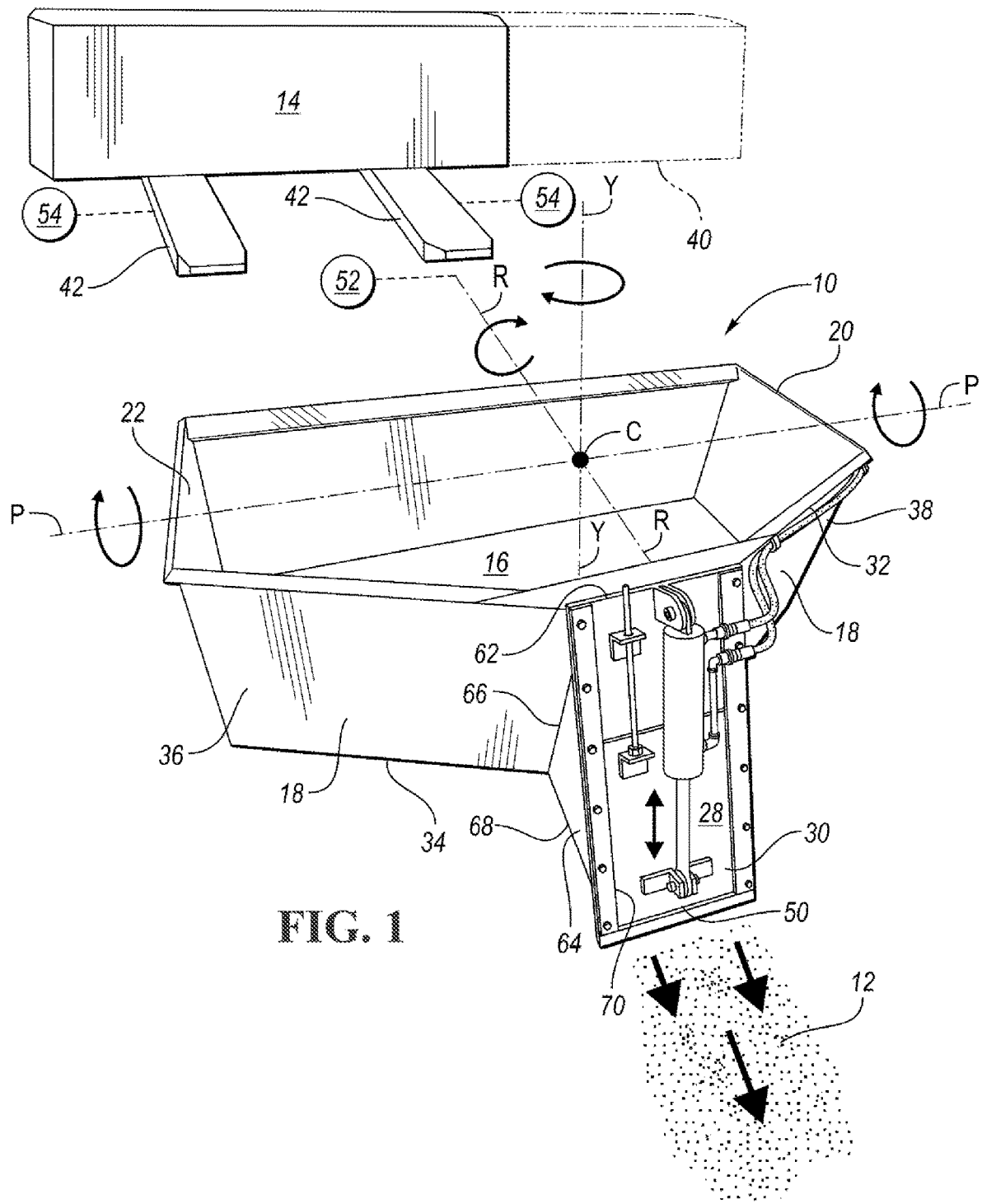
FIG. 1 is a perspective front quartering view from above of one embodiment of a hopper and schematically indicates upward, downward, forward, rearward or radial movement of the hopper's center of gravity ("C of G") in translocating the hopper so that it is positioned above a desired jobsite.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Turning now to FIGS. 1-4, several aspects of this disclosure relate to a translocatable hopper 10 that is mounted for example at the forward part of a front-end loader vehicle 14. The hopper 10 receives, re-positions and delivers a slurry 12 to a jobsite and preferably is detachably attached to the vehicle 14. In several embodiments, the hopper 10 is translocatable from a resting position (see, e.g., FIG. 3) to a delivery position through one or more intermediate positions.

One embodiment of the hopper 10 includes a floor 16 (FIG. 1) and walls 18, 20, 22, 24 that extending upwardly from the floor 16. The walls include a front wall 18 from which the slurry is delivered to a jobsite, a pair of side walls 20, 22 and a back wall 24 that faces the vehicle 14.

Preferably, the front wall 18 (FIGS. 1-2) has an outlet gate 26 and a chute 28 extending therefrom. The chute 28 is configured to direct slurry into the jobsite. A rising and falling sluice gate 30 is associated with the chute 28. In several embodiments, the gate 30 is oriented in a plane that is inclined to a vertical plane when the hopper 10 is in the resting position (see, FIG. 3). The slurry 12 moves outwardly and downwardly from the chute 28 when the sluice gate 30 is at least partially opened as the hopper 10 is placed at or near the delivery position above the jobsite.

Figure 2:
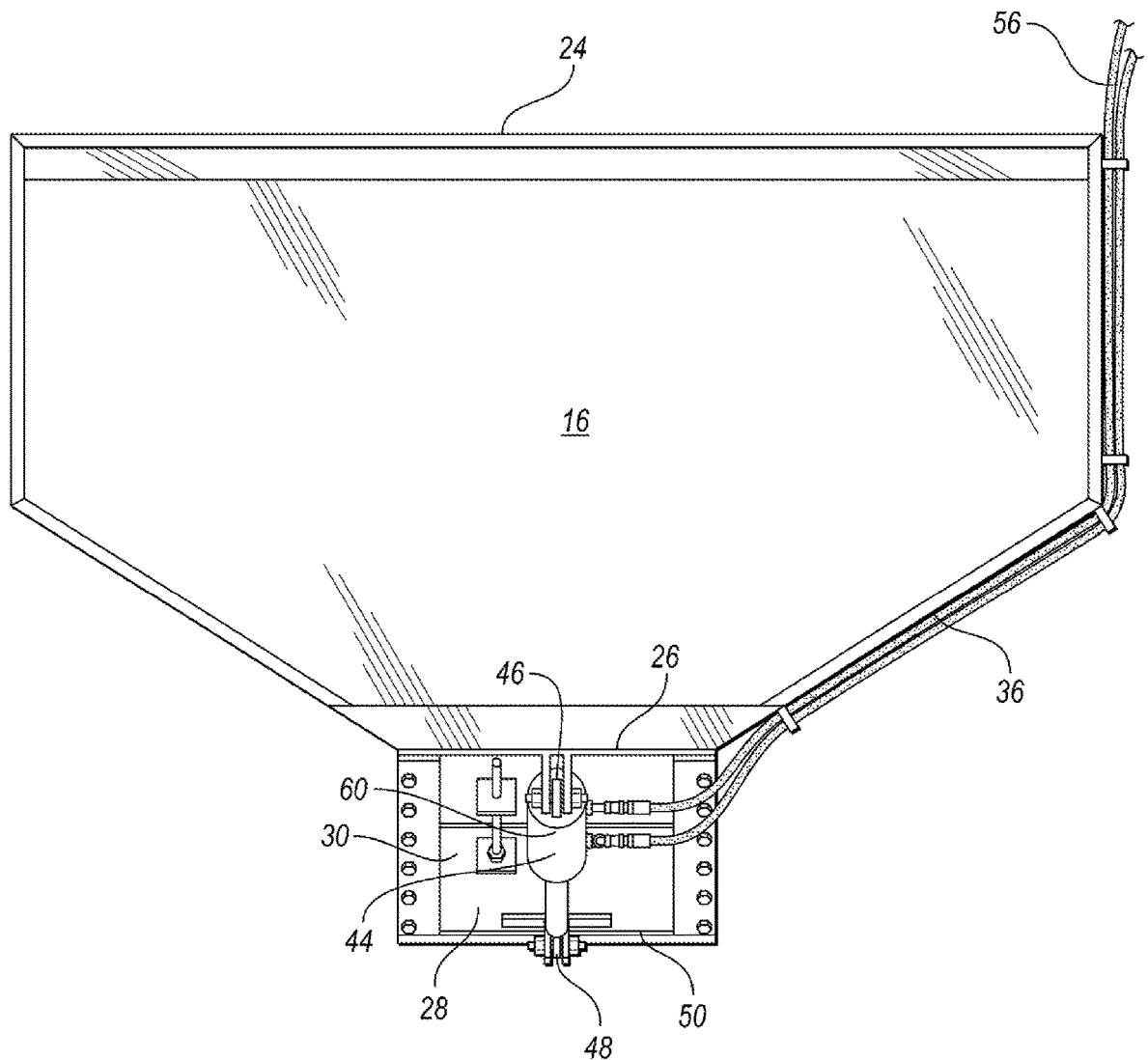
FIG. 2 is a top plan view of the hopper.

In several embodiments, the translocatable hopper 10 has a footprint that is substantially hexagonal (see, FIG. 2). The walls have an upper edge 32 and a lower edge 34. When the hopper 10 is in the resting position, slurry tends to pool, thereby creating a center of gravity of an assembly of the hopper and the slurry.

As depicted in FIGS. 1 and 2, the front wall 18 has two inclined sections 36,38 that meet on either side of the chute 28, so that slurry 12 is funneled and flows forwardly towards the chute 28 and sluice gate 30 as the hopper 10 is pitched forwardly.

The hopper has an imaginary pitch axis about a lateral horizontal reference line (P, FIG. 1), a roll axis about a longitudinal reference line (R) and a yaw axis about a vertical reference line (Y). As slurry is dispensed, the center of gravity of an assembly of the hopper and the slurry tend to move rearwardly toward the vehicle 14. This movement tends to promote stability of the vehicle, hopper and slurry. Such stabilizing characteristics in turn have safety benefits, particularly when the vehicle lies on an inclined terrain and the hopper is oriented toward distal end regions of its path. In such regions, the turning moment is greater than when the hopper lies proximate its resting position. Safety and stability require attention in such configurations.

To support the hopper 10, the vehicle 14 has a leading end 40 (FIG. 1) from which one or more forks 42 extend. The lower edge of the back wall 24 is pivotably attached to the vehicle leading end 40. After attachment of the hopper 10, the forks 42 and thus the hopper 10 can be raised, lowered, extended forwardly or retracted rearwardly between a hopper resting position, a delivery position or moved through intermediary positions. Thus, the leading end 40 of the vehicle 14 and the translocatable hopper 10 can be raised from the resting position, lowered from the delivery position and moved between intermediate positions so that the hopper may be repositioned.

Figure 3:
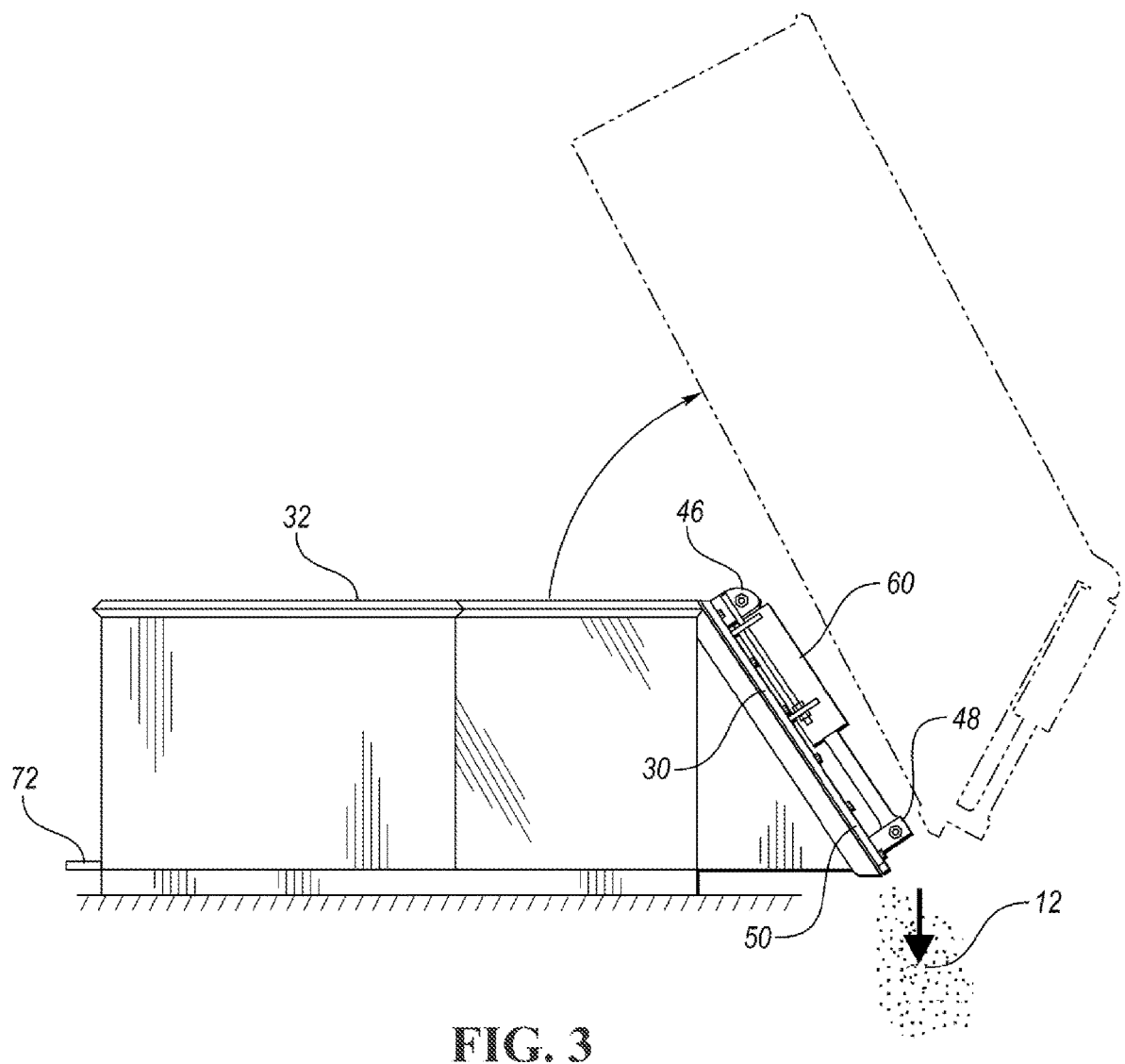
FIG. 3 is a side elevation view thereof.

In several embodiments, the translocatable hopper 10 includes a hydraulic subassembly 44 (FIGS. 2,3). The subassembly has a passive end region 46 attached below the upper edge of the sluice gate 30 and an active end region attached at a lower end region 50 of the sluice gate 30. The hydraulic subassembly 44 is configured to raise and lower the sluice gate 30.

In several embodiments, there is provided a vibrator 52 (FIG. 1) for vibrating the hopper and the slurry about the longitudinal axis (R) so that slurry adhering to the walls descends and drainage of the slurry from the hopper is facilitated. Such a vibrator may for example include an electric motor coupled with a subassembly that induces oscillatory or rocking movement.

As the hopper 10 reaches a delivery point, there is also provided a pitching device for pitching the hopper 10 about the horizontal reference line (P), (FIG. 1) or tilting it so that when the hopper 10 is pitched forwardly over the jobsite and the sluice gate 30 is at least partially opened, slurry flow under gravitational influence is facilitated.

With primary reference to FIGS. 1-3, the hydraulic subassembly 44 includes a rod, a cylinder, a piston and one or more hydraulic lines 56 connecting a source of hydraulic power 58 and the cylinder 60. The sluice gate 30 can be raised and lowered and the hopper 10 can be vibrated about the horizontal axis (P) and/or the vertical axis (R) to facilitate delivery of the slurry 12. Thus, means are provided for vibrating the hopper to facilitate evacuation of the slurry from the chute.

Preferably, as shown in FIG. 1, the chute 28 has an upper edge 62 extending from the upper edge of the front wall 18, a triangular side wall 64 with an apex 66 situated at the upper edge of the front wall 18, and a lower side 68 extending from the lower edge of the front wall 18. A hypotenuse side 70 extends forwardly from the upper edge. The sluice gate 30 is slidingly raised and lowered and is supported by the hypotenuse 70.

Figure 4:
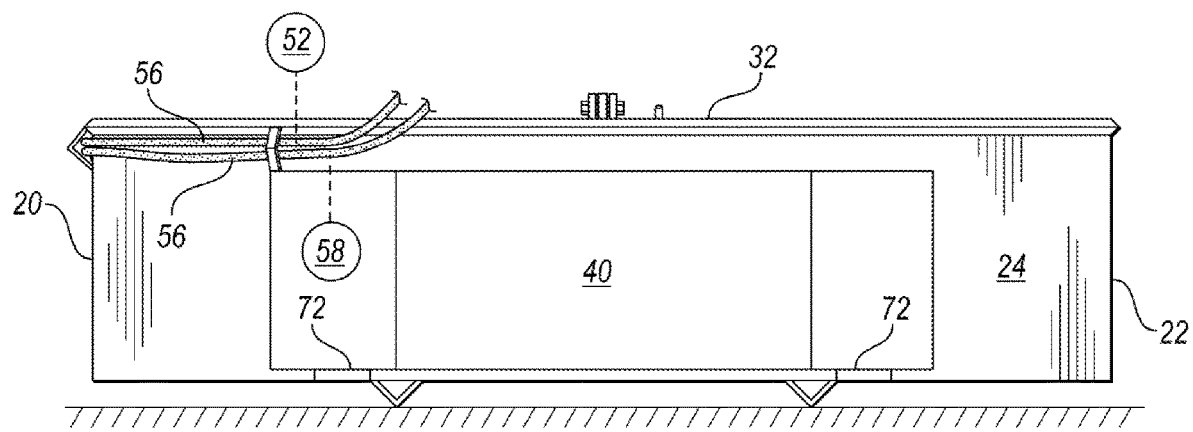
FIG. 4 is a back elevation view thereof.

As shown in FIGS. 3-4, attachment plates 72 extend rearwardly from the lower edge of the back wall 24 for securing the hopper 10 to the vehicle 14.

It will be appreciated that the vehicle 14 may be selected from the group consisting of a multi terrain loader, a dump buggy, a track dumper-buggy, a concrete-power buggy, a radial skid loader, a vertical skid loader, a track loader and an articulated loader.

It will also be appreciated that the slurry 12 may be selected from the group consisting of concrete, cement, mortar, pebbles, rocks, gravel, compost, mulch, soil, dirt, construction waste, and mixtures thereof.

In several embodiments, the sluice gate 30 is adapted to be positionable at or between a raised position, a lowered position and one or more intermediate positions.

In use, the hopper 10 and the slurry 12 have a center of gravity that moves rearwardly as slurry is delivered. As the slurry 12 moves through the chute 28, the center of gravity moves rearwardly, thereby enhancing stability of the hopper and the slurry so that any forwardly-directed tipping tendencies of the hopper and the vehicle are mitigated.

| TABLE OF REFERENCE NUMERALS | |
|---|---|
| 10 | Translocatable hopper |
| 12 | Slurry |
| 14 | Vehicle |
| 16 | Floor |
| 18 | Front wall |
| 20 | Side wall |
| 22 | Side wall |
| 24 | Back wall |
| 26 | Outlet gate |
| 28 | Chute |

| TABLE OF REFERENCE NUMERALS | |
|---|---|
| 30 | Sluice gate |
| 32 | Upper edge of wall |
| 34 | Lower edge |
| 36 | Inclined section of front wall |
| 38 | Inclined section of front wall |
| 40 | Vehicle leading end |
| 42 | Forks |
| 44 | Hydraulic sub-assembly |
| 46 | Passive end region |
| 48 | Active end region |
| 50 | Lower end region of the sluice gate |
| 52 | Vibrator for vibrating the hopper and the slurry |
| 54 | Pitching device |
| 56 | Hydraulic lines |
| 58 | Source of hydraulic power |
| 60. | Cylinder |
| 62 | Upper edge of chute |
| 64 | Triangular side wall |
| 66 | Apex |
| 68 | Lower side |
| 70 | Hypotenuse |
| 72 | Attachment plates |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A translocatable hopper for receiving, re-positioning and delivering a slurry to a jobsite, the hopper being detachably attached to a vehicle, the hopper being translocatable from a resting position to a delivery position through one or more intermediate positions, the hopper comprising:
   a floor having a footprint that is substantially hexagonal for promoting a funneling effect;
   walls extending upwardly from the floor, the walls including a front wall with a pair of inclined sections to urge the slurry towards a chute, a pair of side walls and a back wall that faces the vehicle;
   the front wall having the chute extending therefrom, the chute being configured to direct slurry into the jobsite;
   a rising and falling sluice gate associated with the chute, the gate being oriented in a plane that is inclined to a vertical plane when the hopper is in the resting position, the slurry moving outwardly from the chute when the sluice gate is at least partially opened as the hopper is placed at or near or above the delivery position; and
   a hydraulic subassembly having a passive end region attached to an upper edge region of the sluice gate and an active end region attached to a lower end region of the sluice gate, the hydraulic subassembly being configured to raise and lower the sluice gate and support the sluice gate in an intermediate position.

2. The translocatable hopper of claim 1, the walls having an upper edge and a lower edge, so that when the hopper is in the resting position, slurry tends to pool, thereby creating a stabilized lowered center of gravity of an assembly of the hopper and the slurry.

3. The translocatable hopper of claim 1, wherein the hopper has a horizontal pitch axis (P), a longitudinally oriented roll axis (R) and a vertical yaw axis (Y).

4. The translocatable hopper of claim 2, wherein the vehicle has a leading end from which one or more forks extend to support the hopper, the lower edge of the back wall being pivotably attached to the leading end.

5. The translocatable hopper of claim 1, wherein a leading end of the vehicle can be raised from the resting position, lowered from the delivery position and moved between intermediate positions so that the hopper may be repositioned.

6. The translocatable hopper of claim 3, further including a vibrator for vibrating the hopper and the slurry about the longitudinal axis and/or the vertical axis so that drainage of the slurry from the hopper is facilitated.

7. The translocatable hopper of claim 3, further including a pitching device for pitching the hopper about the pitch axis (P) so that when the hopper is pitched forwardly over the jobsite and the sluice gate is opened, slurry flow is facilitated.

8. The translocatable hopper of claim 1, wherein the hydraulic subassembly includes a rod, a cylinder, a piston and one or more hydraulic lines connecting a source of hydraulic power and the cylinder so that the sluice gate can be raised and lowered and the hopper can be vibrated to facilitate delivery of the slurry.

9. The translocatable hopper of claim 1, wherein the chute has an upper edge affixed to the upper edge of the front wall, a triangular side wall with an apex situated at the upper edge of the front wall, a lower side extending from the lower edge of the front wall, and a hypotenuse side edge extending forwardly from the upper edge, the sluice gate being raised, lowered and supported by the hypotenuse side edge.

10. The translocatable hopper of claim 1, further including attachment plates extending rearwardly from a lower edge of the back wall for securing the hopper to the vehicle.

11. The translocatable hopper of claim 1, wherein the vehicle is selected from the group consisting of a multi terrain loader, a dump buggy, a track dumper-buggy, a concrete-power buggy, a radial skid loader, a vertical skid loader, a track loader and an articulated loader.

12. The translocatable hopper of claim 1, wherein the slurry is selected from the group consisting of concrete, cement, mortar, pebbles, rocks, gravel, compost, mulch, soil, dirt, construction waste, and mixtures thereof.

13. The translocatable hopper of claim 1, wherein the sluice gate is adapted to be positionable at or between a raised position, a lowered position and one or more intermediate positions.

14. The translocatable hopper of claim 1, wherein the hopper and the slurry have a center of gravity, so that as the slurry moves through the chute, the center of gravity moves rearwardly, thereby enhancing stability of the hopper, the slurry and the vehicle so that any forwardly-directed tipping tendencies of the hopper and the vehicle are mitigated.

* * * * *